Oct. 3, 1950     C. S. J. MacNEIL ET AL     2,524,630
PRESSURE CONTROL VALVE

Filed Dec. 23, 1943     2 Sheets-Sheet 1

INVENTORS
CHARLES S.J. MacNEIL
JOHN F. HAINES
RICHARD E. MOORE
HOWARD CARSON
ATTORNEYS

INVENTORS
CHARLES S.J. MacNEIL
JOHN F. HAINES
RICHARD E. MOORE
HOWARD CARSON
ATTORNEYS

Patented Oct. 3, 1950

2,524,630

UNITED STATES PATENT OFFICE 2,524,630

PRESSURE CONTROL VALVE

Charles S. J. MacNeil, John F. Haines, Richard E. Moore, and Howard Carson, Dayton, Ohio, assignors to General Motors Corporation, Detroit, Mich., a corporation of Delaware Application December 23, 1943, Serial No. 515,456

6 Claims. (Cl. 137—140)

This invention relates to the control of fluid circuits for fluid operated control mechanism in aircraft propellers.

A principal object of the invention is to provide a control valve suitable for controling the high limit of a fluid pressure circuit, and one that will automatically free its discharge port of any solid or foreign matter.

Another object of the invention is to provide a pressure control valve that will operate efficiently and free itself from interference by foreign matter should it find its way into the fluid medium.

Another object is to provide a control valve with means for stabilizing its action against flutter by means of viscous damping providing restriction to high frequency motion by the urge of pressure or heavy spring force.

Other objects contemplated include the piloting of a cylindrical pressure limiting valve with the elimination of cocking and binding of closely calibrated relatively movable parts, the counteraction of inertia effect in a centrifugally operated valve through the use of proper damping means, the provision of a control valve that will be of the simplest construction and easiest of assembly without the use of special tools, and the provision of a control valve that will maintain stable control of pressure under all operating conditions with a minimum of leakage and wear at the metering parts.

Further objects and advantages of the present invention will be apparent from the following description, reference being had to the accompanying drawings wherein a preferred embodiment of the present invention is clearly shown.

Figure 1:
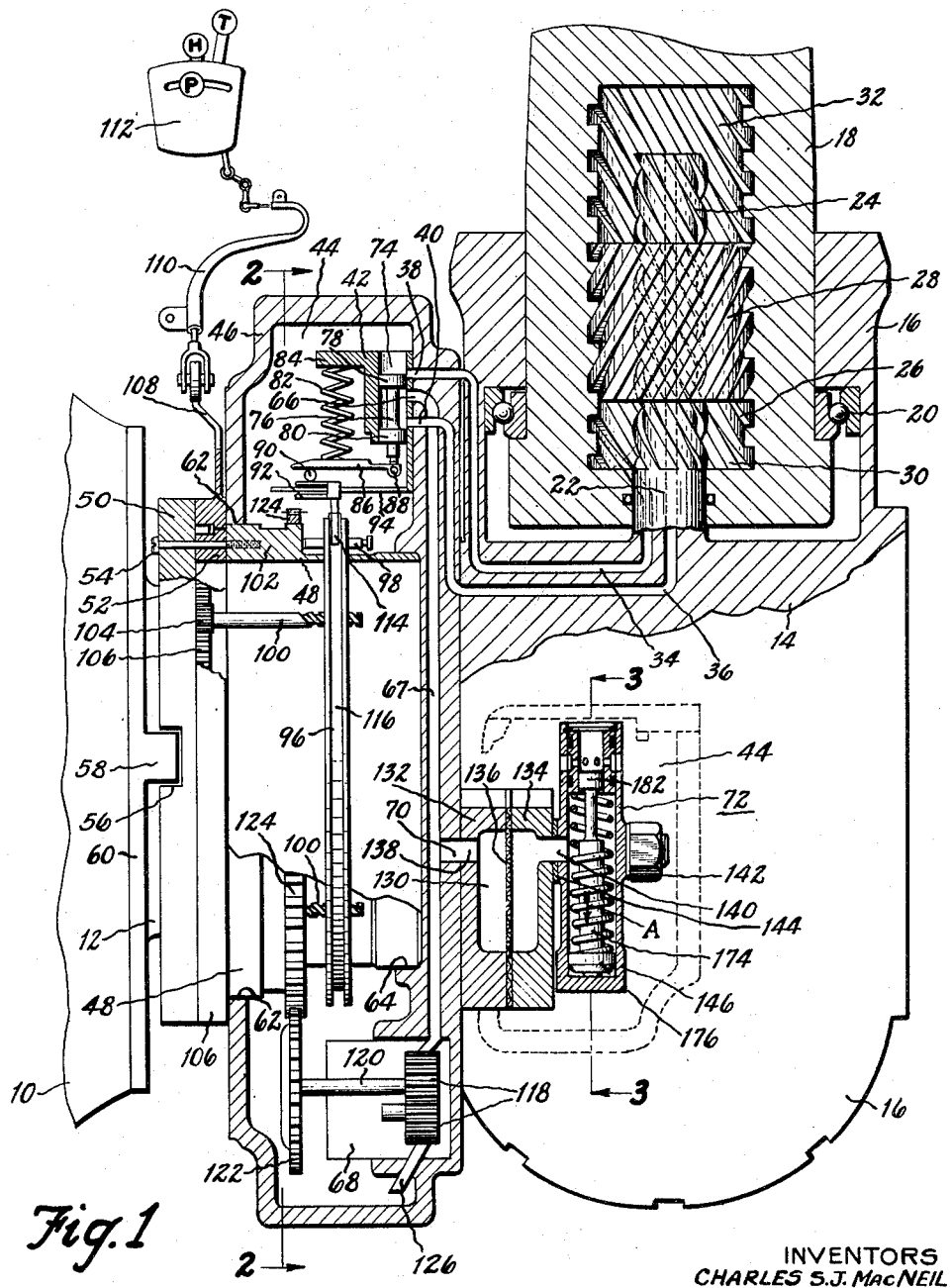
Fig. 1 is a schematic sectional view of a propeller hub and regulator of the fluid operated type illustrating the fluid circuit into which the proposed structure is adapted for connection and operation, the view being substantially as indicated by the line and arrows 1—1 of Fig. 2.

Referring first to Fig. 1 for a general description, 10 refers to an engine nosing or gear casing from which extends a rotatable shaft 12 for the driven rotation of a propeller hub 14 having a plurality of sockets 16 mounting a plurality of blades 18 adapted to turn upon their individual axes for pitch adjustment. The blades 18 are provided with suitable bearings 20 and are journalled about a spindle 22 extending radially from the hub 14 to provide a splined extension 24 located in an internal splined chamber 26 within the root of the blade 18. A piston member 28 has internal splines working on the splined extension 24 of the spindle, and external splines working on the splines of the chamber 26, and fits with a substantial fluid tight relation to divide the chamber 26 into pressure chambers 30 and 32 inward and outward of the piston 28. Embodied in the hub 14 and extended into the spindle 22 there are a pair of control passages 34 and 36 which open into the chambers 30 and 32 respectively at one end and communicate at the other end with control ports 38 and 40 in a governor valve assembly 42 located in a reservoir 44 provided by a regulator housing 46.

The regulator housing is usually mounted on a rear tubular extension of the hub 14, and exists in the form of an annular chamber whose inner bounds are closed off by an adapter sleeve 48 supported by a plate 50 by means of a spacer ring 52 and screw devices 54. The plate 50 is notched at 56 to engage a lug 58 provided by a pilot plate 60 rigidly mounted on the engine nosing 10, and provides a structure for restraining rotation of the adapter sleeve 48 but permits it to weave and wobble relative to the propeller shaft and thus to follow any eccentric movement of the regulator during rotation of the propeller. The adapter sleeve extends across the annular housing such as to have bearing engagement at 62 and 64 with the housing, and thus complete enclosure of the reservoir 44 which provides a container for the pressure operating fluid, and houses the control elements by which the pitch of the blades is changed.

Among the control elements enclosed in the reservoir there are the governor valve assembly 42, which has a pressure supply port 66 with a passage 67 in the body of the housing leading to a pump 68, and a branch 70 communicating with a control valve 72, the subject of the instant invention. The governor valve assembly 42 embraces a block mounted on the inner face of the housing and has a bore 74 disposed radially of the axis of propeller rotation and into which open the ports 38, 40 and 66 to be selectively controlled by a plunger 76 having lands 78 and 80 normally covering the ports 38 and 40 when the plunger is in equilibrium position. The equilibrium or balanced position of the plunger is attained by centrifugal force acting upon the plunger 76 to throw it radially outward and opposed by the constantly applied force of a spring 82 supported by a shelf or ledge 84 and engaging a lever 86 pivoted at 88 to the plunger 76 and resting upon a movable fulcrum 90. The fulcrum 90 is mounted on a carriage 92 that is adapted to slide upon guide ways 94 carried by the block, and is adapted to move to either side of the line of spring force, but for the most part is restricted during constant speed operation of the mechanism to be moved only along the outer limits of the guide ways.

Means for moving the carriage during operation of the propeller is embodied in a control ring 96 surrounding and movable axially of the adapter sleeve 48 where it is guided by the limit pins 98, its movement being effected by a plurality of high lead screws 100 journalled in a thickened flange 102 of the adapter sleeve and the spacer ring 52 where pinions 104 of the high lead screws mesh with an internal ring gear 106 journalled about the spacer ring 52 and disposed between the housing flange 46 and the plate 50. The ring gear 106 is provided with a lever 108 to which is attached suitable linkage 110 connected with a manual controller 112 located in the pilot's compartment. Movement of the pitch control lever in the cockpit causes the ring gear 106 to rotate the high lead screws 100 which in turn effect the axial movement of the control ring 96 and due to the shoe 114 of the carriage 92 riding in a groove 116 of the control ring effects movement of the fulcrum toward and from the valve plunger, thus changing the movement arms through which the spring force and centrifugal force act upon the valve plunger 76.

The pump 68 comprises a unit mounted in a well of the housing and embraces a pair of gears 118 one of which is driven by a shaft 120 having a pinion 122 meshing with a toothed flange 124 on the thick portion 102 of the adapter sleeve, such that rotation of the propeller mechanism about the adapter sleeve causes the gear 122 to roll over the toothed flange 124 and effect rotation of the meshing gears 118 that draws in fluid from the reservoir 44 through the intake pipe 126 and discharges the fluid under pressure into the pressure passage 67 from which it is expendable into the passage 70, and through the port 66 to the bore 74 of the governor valve assembly 42. Designedly, the output of the pump 68 is considerably in excess of the amount of fluid that would be permitted to flow into the ports 38 and 40 during the pitch control operations, and means are therefore provided to spill the excess over and above a maximum developed pressure back into the reservoir.

Figure 2:
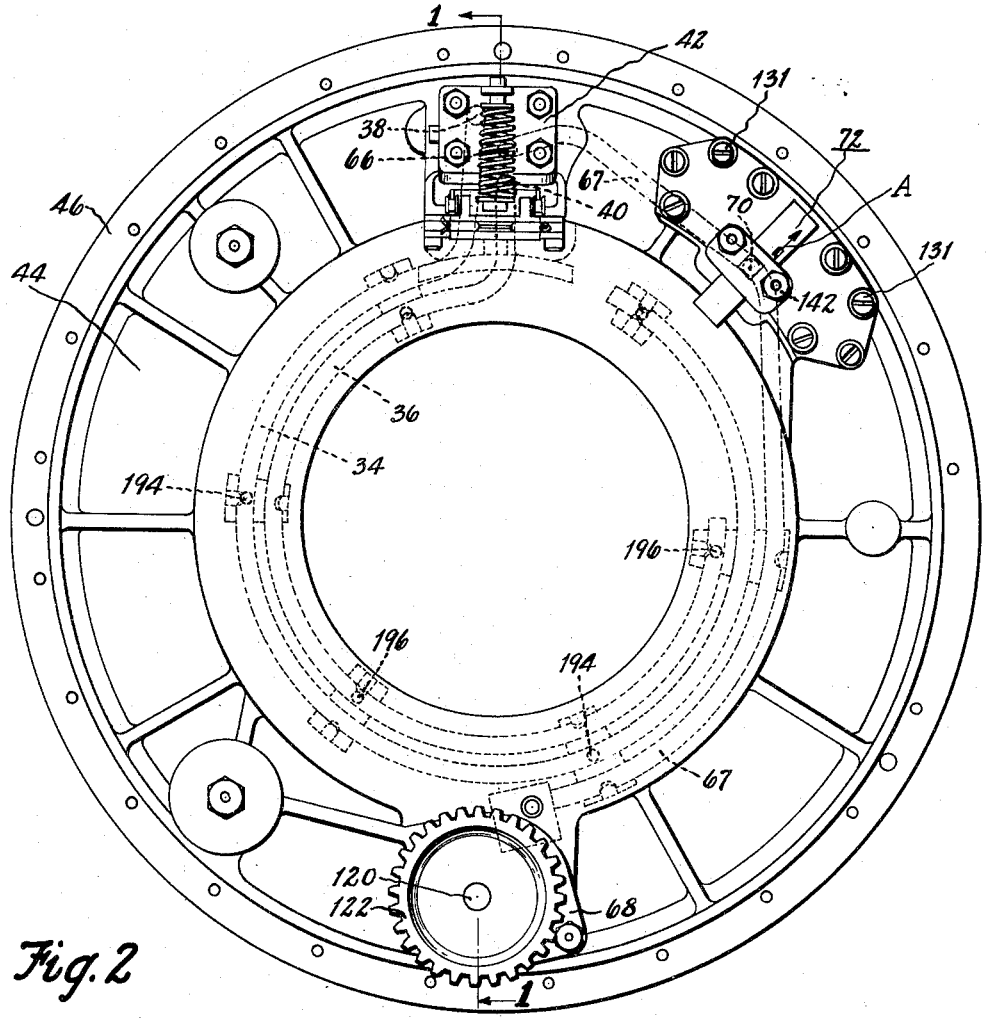
Fig. 2 is an elevational view of the regulator plate with its cover removed to show the relation of the control elements, it being a view substantially as indicated by the line and arrows 2—2 of Fig. 1.
Figure 3:
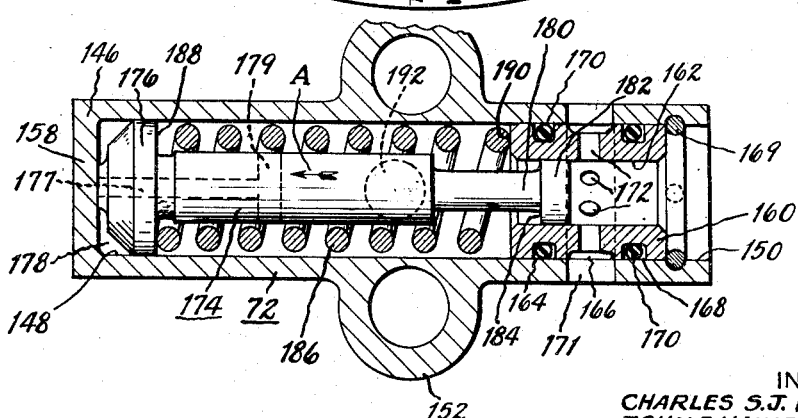
Fig. 3 is an enlarged sectional view of the control valve substantially as indicated by the line and arrows 3—3 of Fig. 1.

The device accomplishing the return of fluid to the reservoir and controlling the pressure developed in the fluid circuit is the pressure control valve 72 shown in its functional relation in Fig. 1, and in enlarged section in Fig. 3. The pressure control valve is in fact mounted on the housing within the reservoir somewhat as shown in Fig. 2, but for the purpose of illustration it has been otherwise shown in Fig. 1, though its inclusion within the reservoir is suggested by the dotted line showing of the reservoir 44. Communicating with the passage 70 there is a filter chamber 130 formed by the cooperation of two chambered members 132 and 134 clamping a close mesh screen 136 which acts as a permeable partition across the chamber 130, screw devices 131 holding the parts in fluid tight relation. The chamber member 132 has a port or opening 138 aligned with the passage 70 while the member 134 has an outlet opening 140 leading to the control valve 72, and the blocks or members 132 and 134 are retained in mounted relation on the housing 46 by means of appropriate screw devices 142 that operate also to hold the valve 72 in assembly with the filter unit, there being an appropriate gasket 144 disposed between the valve and filter.

For the specific structure of the pressure control valve 72, reference is now made to Fig. 3 where there is shown a tubular casing 146 having a cylindrical bore with ground surfaces 148 and 150 at opposite ends and concentrically arranged with respect to the longitudinal axis. Two apertured ears 152 are provided to facilitate mounting by means of the screw devices 142, and the outer end of the casing or that which contains the ground surface 148 is closed by an integrally formed head member 158 which renders the end of the casing leakage proof. The opposite or inner end of the casing 146 is fitted with a tubular insert 160 engaging the ground surface 150 to provide a concentric ground bore 162. The tubular insert is in the nature of a sleeve that extends endwise within the casing 146 and provides three axially spaced annular grooves 164, 166 and 168 exposed to the bore of the casing. In the grooves 164, 168 there are disposed sealing rings 170 that prevent leakage between the insert and casing. Extending through the wall of the insert 160 there are a plurality of cross bores 172 connecting the groove 166 with the ground base 162. A snap ring 169 lodges in a groove at the open end of the casing 146 for retaining the sleeve in assembled relation with the casing, and the latter is apertured at 171 for opening the groove 166 to the outside of the casing.

The exhaust of fluid and consequently reduction of pressure through the passages 172 and 171 is controlled by a spring pressed plunger 174 housed within the casing and having portions closely fitting with the ground surfaces 148 and 162. The plunger is of substantial mass and has a head member 176 ground to closely fit within the bore 148 which acts as a pilot for movement of the plunger. Passages 177 and 179 in head 176 connect a chamber 178 between the head 176 and the closed end 158 with the cylindrical bore on the opposite side of the head 176. The head cooperates with the chamber 178 to dampen movement of the plunger and the rate of damping is controlled by the cross-sectional area of passages 177 and 179. The plunger further has a reduced or necked portion 180 connected to a terminal head 182 by a shoulder 184 providing clearance for the flow of fluid from the bore of the casing 146 to the ports 172 when exposed to the fluid pressure within the casing. The total effective piston area is defined by the disc area of the terminal head 182, and may be increased or diminished by altering the diameter of the terminal head and ground bore 162. Housed within the casing 146 and disposed about the plunger 174 is a relatively stiff helical spring 186 that bears at one end against a shoulder 188 adjacent the head of the plunger and at the other end engages an end surface of the tubular insert at 190. The casing has a transverse opening 192 that opens its interior to the filter chamber when the pressure control valve is mounted in place.

The control valve 72 is so mounted on the regulator plate that the plunger 174 will be displaced along a radius of rotation for the propeller mechanism somewhat as shown in Fig. 2, and is so disposed that the weighted head 176 will be radially outward and the terminal head or valving portion will be radially inward of the assembly.

In the normal rest position, or when the pressure of the system is low, the valve and casing will have a relation practically as shown in Fig. 3, in which the damping chamber 178 is practically collapsed, and the terminal head 182 will completely stop any flow through exhaust ports 172, and be wholly on the radially outward sides thereof. The method of mounting will so couple the force of the compression spring 186 and the centrifugal force acting on the mass of the valve plunger that they will be in aiding relation to maintain the terminal head 182 in closing relation with respect to the ports 172. When the propeller is operating sufficient opposition is then built up by the fluid pressure on the effective area of the piston to move the plunger to a position for opening the ports 172 to the interior of the casing and hence to the opening 192. The direction of the force of the spring and centrifugal force applied to the plunger is illustrated by the arrow A in the various views. On reference to Fig. 2 it will be observed that the direction of these forces are radially outward, and that the discharge of liquid from the valve unit is at the radially inward end as shown in Fig. 1.

It is understood of course that the regulator has as many branches 34 and 36 of the passages from the ports 38 and 40 as there are blades on the hub and torque units or pistons 28 for moving the blades. That is accomplished in the actual structure by extending the passages 34 and 36 well around the circumference of the hub and then tapping into those passages at 194 and 196 for fluid leads to each of the torque units, substantially as shown in Fig. 2. Reference to Fig. 1, therefore, should suffice to depict the operation of the structure insofar as rotation of the propeller mechanism about the relatively fixed part 48 will effect actuation of the pump 68 to charge the pressure line 67 with fluid under pressure, which is impressed upon every element whose fluid circuit is open thereto. As shown in Fig. 1, the filter unit and pressure control valve are directly exposed to the pressure developed, as is also the governor valve assembly 42. In the illustrated setting of the valve plunger 76 the pressure port 66 is there open to the control port 40 which leads by passage 36 to the chamber 32 on the outside end of the piston 28 for each torque unit, the chamber 30 on the inside end of the piston being open through the control passage 34 and control port 38 and bore 74 to return to the reservoir 44. Consequently the piston 28 will be moved radially inward of the axis of rotation and the blade 18 will be rotated to effect a reduction of pitch, which when accomplished sufficient to satisfy the conditions of regulation called for by the governor valve assembly will effect return of the governor valve to the equilibrium position. The governor valve mechanism is sensitive in its operation and effects close regulation of the pitch to the extent that great changes are never required, and therefore no great amount of flow of that available is used in effecting the regulated shift. Continued operation of the pump 68 builds up pressure to a desired high degree which may be stored in an accumulator for future use, or it may be existent only in the remaining continuously active portion of the fluid circuit, and is controlled within a predetermined high value by the pressure control valve 72. As one example of desired pressure charge in the system, whether it be fitted with an accumulator, or existent in the fluid circuit illustrated, consider that the active circuit is charged with a pressure of 950 pounds per square inch to give a flow of 150 to 160 cubic inches per minute. Then the pressure control valve will be so designed and so mounted that the force exerted by the spring 186 and the centrifugal force acting on the plunger 174 will require the exertion of 950 pounds of pressure per square inch on the effective piston area before the terminal head 182 will be moved to a position to expose the ports 172 to the bore of the casing 146. While these forces are acting the fluid pressure in the bore of the casing is being built up and exerts itself on both sides of the head 176 through the bleed passages 177 and 179, wherefore the active area of the piston opposing the spring and centrifugal force is limited substantially to the area of the terminal head. The bleed passages 177, 179 and the damping chamber 178 are sufficient to prevent quick action of the valve plunger and thus prevent hunting and flutter.

A fluid pressure system of the type is always subject to lodgement or entering by one cause or another of chips and other foreign matter, and while the pump intake 126 is amply screened to prevent entrance of foreign matter into the fluid passages, further precautions are taken to remove such matter that may find its way into the fluid medium by interposing the filter unit 130 in the pressure line, for the specific purpose of protecting the control valve 72. However, should any foreign matter pass the filter screen 136 it will not seriously affect the operation of the pressure control valve 72 due to the high spring and centrifugal force to be opposed by the piston area. In event of a chip lodging in the outlet ports 172 and tending to hold the valve open, the high spring and centrifugal force would act to move or shear it off. Further, with any consequential opening of the ports 172 the relief of pressure from the bore of the casing will carry any chips outwardly into the reservoir. The piloting head of the valve plunger also insures against cocking of the valving ports, and its mass in conjunction with the damping provisions reduces the inertia effect that is common with valves with large pressure areas.

In the specific embodiment of the control valve 72, all critical features of the construction are concentrated about the terminal head and tubular insert, and principally in the latter. A change in location of the exhaust ports 172, or a change in size of those ports, and a change in effective area of the piston or terminal head 182 can be made without scrapping of a major part of the assembly, as might be the case if the ground base and exhaust ports were located in the casing 146. Leakage from the damping chamber 178 is eliminated by the integral construction of casing 146 and head 158, thus accurately defining the damping by the bores 177, and 179, which cannot be interfered with by the spring 186 seating on the head 176, were the damping passages cut in the surface of the head. Also the properties of the damping passages are not altered by wear through continuous or frequent movement of the plunger 174, as might be the case if the damping passages were to be located on the surface of the head 176. That results in there being no substantial pressure drop on the two sides of the head 176, which makes for controlled damping under all conditions of operation.

The casing 146 forms a deflector for the high velocity oil or fluid discharged through ports 172, since there are six of the ports 172 that open into the channel 166, and two large openings 171 through the casing, thus providing a space 166 where the discharging fluid looses its high velocity and is discharged to the reservoir of the regulator at a relatively low velocity. Since the groove 166 is always kept full of fluid through ports 171, there is no mixing of air with high velocity fluid coming from 172, and hence frothing and foaming of the fluid is prevented.

In the propeller construction under consideration, the force required for the pitch changing mechanism increases as the square of the speed, and it follows that the pressure should increase as the speed since the higher pressures are only needed when the speed is high. The piston being relatively heavy, and the centrifugal force being a substantial factor in the control of the pressure that is controlled, then a unit is provided that is adaptable for a wide range of speeds of operation, and it follows that the components of control, centrifugal force and line pressure, will vary as the propeller is rotating at top speed or at some intermediate speed, yet the fluid circuit will always be safeguarded against reaching pressures over the predetermined 950 pounds per square inch.

While the embodiment of the present invention as herein disclosed, constitutes a preferred form, it is to be understood that other forms might be adopted, all coming within the scope of the claims which follow.

What is claimed is as follows:

1. A pressure control valve comprising in combination, a tubular casing having a pair of apertured ears for securement to a rotatable support, said casing having a main bore exposed to a source of pressure to provide a pressure chamber and communicating at one end thereof with a reduced bore, exhaust ports opening from the reduced bore, a piston slidable in the reduced bore and providing a pressure area exposed to the chamber pressure and adapted to slide axially of the casing for connecting the exhaust ports therewith, a piloting portion connected with the piston and having a head slidable along the larger bore of the casing, spring means disposed between the piloting portion and the reduced bore of the casing tending to maintain the piston valve closed by urging the piston to a position between the pressure chamber and the exhaust ports, an integrally joined head member for the casing to provide a fluid tight damping chamber at the end of the piloting portion, and a restricted passage in the pilot portion connecting the damping chamber with the pressure chamber of the casing whereby movement of the piston in either direction along the casing bore is damped by the flow of fluid to and from the damping chamber.

2. The combination set forth in claim 1, wherein the area of the valving piston is equivalent to a relatively small area of the head of the piloting portion.

3. The combination set forth in claim 1, wherein a porting sleeve fixed within the casing provides the reduced bore, and the pressure control valve is assembled through the open end of the casing before the porting sleeve is affixed.

4. The combination set forth in claim 1 wherein one end of the casing is fitted with a porting sleeve providing said reduced diameter bore, and wherein a cylindrical passage between the casing and porting sleeve is included to provide an annular chamber into which the exhaust ports empty for elimination of frothing.

5. A pressure control valve comprising in combination, a tubular casing having an integrally closed end and laterally extending mounting lugs intermediate its ends, an intake port to the bore of the casing remote from the open end thereof, exhaust ports diametrically disposed at the open end of the casing, a piston with stepped heads movable lengthwise of the casing, one of said heads being slidable in the bore of the casing at the normally closed end thereof to provide a damping chamber, a restricted passage through said head connecting the damping chamber with the bore of the casing, a porting sleeve disposed in the open end of the casing having a smaller bore concentric with the bore of the casing, and adapted to slidingly receive the smaller of the stepped piston heads, said sleeve having an annular groove constantly communicating with the exhaust ports of the casing, and cross passages connecting the groove with the bore of the sleeve, and spring means disposed between the larger head of the piston and the porting sleeve tending to diminish the volume of the damping chamber, and normally urging the smaller head to a position between the porting sleeve inlet and the exhaust ports, the smaller of the stepped piston faces defining an area subject to the pressure exerted through the intake port for opposing the spring movement of said piston.

6. A pressure control valve comprising in combination, a casing having a cylindrical bore with an integrally closed end wall, means connecting the bore with a fluid pressure source, a porting sleeve secured in the open end of the bore providing a concentric bore of reduced diameter for reception of a valving piston, cross passages through the casing and sleeve opening the bore of the sleeve to the outside of the casing, resilient seal means disposed between the sleeve and casing, a valving piston slidable lengthwise of the casing and having a damping head guided at the closed end thereof so as to provide a damping chamber, a restricted flow passage traversing the head so as to connect the damping chamber and the cylindrical bore, and a valve head slidable lengthwise of the porting sleeve to connect and disconnect the cross passage of the sleeve with the bore of the casing, a compression spring disposed between the damping head and porting sleeve tending to urge the damping head against the closed end of the casing and to adjust the valve head to a position on the high pressure side of the cross passages of the porting sleeve, said valving piston being reduced in diameter adjacent the valve head to permit free flow when the piston is situated on the low pressure side of the cross bores of the sleeve.

CHARLES S. J. MACNEIL.
JOHN F. HAINES.
RICHARD E. MOORE.
HOWARD CARSON.

REFERENCES CITED

The following references are of record in the file of this patent:

UNITED STATES PATENTS

| Number | Name | Date |
|---|---|---|
| 2,080,824 | Kane | May 18, 1937 |
| 2,103,299 | Ravnsbeck | Dec. 28, 1937 |
| 2,307,102 | Blanchard et al. | Jan. 5, 1942 |
| 2,327,830 | Stevenson | Aug. 24, 1943 |
| 2,391,699 | Haines | Dec. 25, 1945 |

FOREIGN PATENTS

| Number | Country | Date |
|---|---|---|
| 113,329 | Australia | of 1941 |
| 703,319 | Germany | Mar. 6, 1941 |